United States Patent [19]
Kita et al.

[11] 4,257,276
[45] Mar. 24, 1981

[54] PROBE UNIT OF FLUID FLOW RATE MEASURING APPARATUS

[75] Inventors: Toru Kita, Yokohama; Hiroshi Kobayashi; Takeshi Fujishiro, both of Yokosuka, all of Japan

[73] Assignee: Nissan Motor Company, Limited, Yokohama, Japan

[21] Appl. No.: 42,463

[22] Filed: May 25, 1979

[30] Foreign Application Priority Data

May 29, 1978 [JP] Japan .................................. 53-63340
Aug. 30, 1978 [JP] Japan .................... 53-118810[U]

[51] Int. Cl.³ .............................................. G01F 1/32
[52] U.S. Cl. .................................................. 73/861.22
[58] Field of Search ..................................... 73/194 VS

[56] References Cited

U.S. PATENT DOCUMENTS

| | | |
|---|---|---|
| 3,693,438 | 9/1972 | Yamasaki et al. ...................... 73/194 |
| 3,863,500 | 2/1975 | Yamasaki et al. ...................... 73/194 |
| 4,182,165 | 1/1980 | Kita ...................................... 73/194 |

FOREIGN PATENT DOCUMENTS 2453973  5/1976  Fed. Rep. of Germany ............ 73/194

Primary Examiner—Herbert Goldstein
Attorney, Agent, or Firm—Schwartz, Jeffery, Schwaab, Mack, Blumenthal & Koch

[57] ABSTRACT

A slot of a vortex generating body in which alternating fluid flow occurs in response to shedding of vortexes from the body is narrowed at the middle section thereof where a fluid flow sensing element such as a hot wire is located.

9 Claims, 21 Drawing Figures

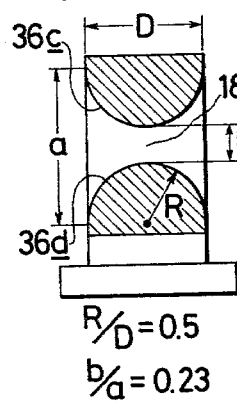
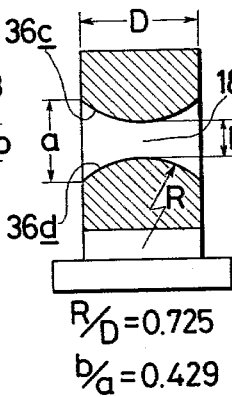
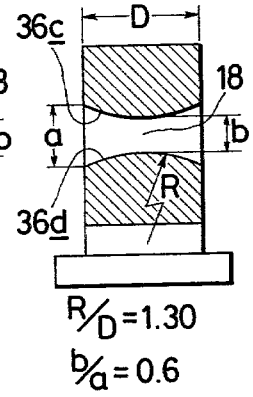
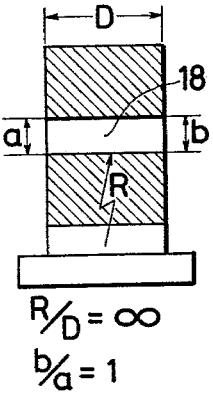
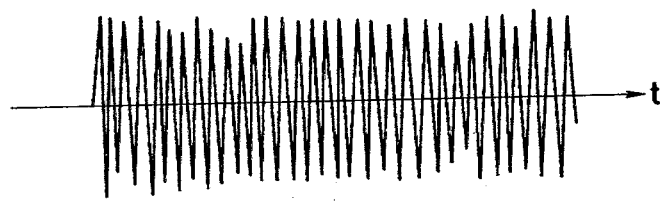
FIG. 11A
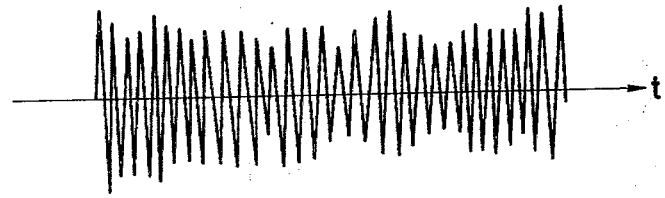
FIG. 11B
FIG. 11C
FIG. 11D

PROBE UNIT OF FLUID FLOW RATE MEASURING APPARATUS

FIELD OF THE INVENTION

The present invention relates in general to a fluid flow rate measuring apparatus and more particularly to a probe unit of an apparatus to which the theory "Karman vortex street" is practically applied.

BACKGROUND OF THE INVENTION

It is known that, under certain conditions, a "Karman vortex street" is shed in the wake of a bluff body when a flow of fluid is perpendicular to the body. The shedding of vortexes occurs periodically first from one side of the body and then from the other in accordance with the velocity of the flow. Thus, by counting the number of the vortexes created by the body in a unit time, the flow rate of the fluid can be measured.

Hitherto, a number of fluid flow rate measuring apparatuses have been presented by putting the above theory into practical use.

OBJECTS OF THE INVENTION

It is an object of the present invention to provide an improved probe unit of a fluid flow rate measuring apparatus which puts the theory "Karman vortex street" into practical use.

It is another object of the present invention to provide an improved probe unit of the apparatus which is characterized by high detecting ability and high responsiveness thereof.

Other objects and advantages of the present invention will become apparent from the following description when taken in conjunction with the accompanying drawings.

BRIEF DESCRIPTION OF THE DRAWINGS

FIGS. 10A to 10D are sectional views of probe units having different slots, with sensing elements being removed for clarification of the drawings;

FIGS. 11A to 11D are waveform charts, respectively depicting the performances of the probe units of FIGS. 10A to 10D;

DESCRIPTION OF A CONVENTIONAL PROBE UNIT

Prior to describing in detail the construction of the probe unit of the invention, an outlined explanation of a conventionally used fluid flow rate measuring apparatus which puts the theory "Karman vortex street" into practical use will be made with reference to FIG. 1 in order to clarify the invention.

Figure 1:
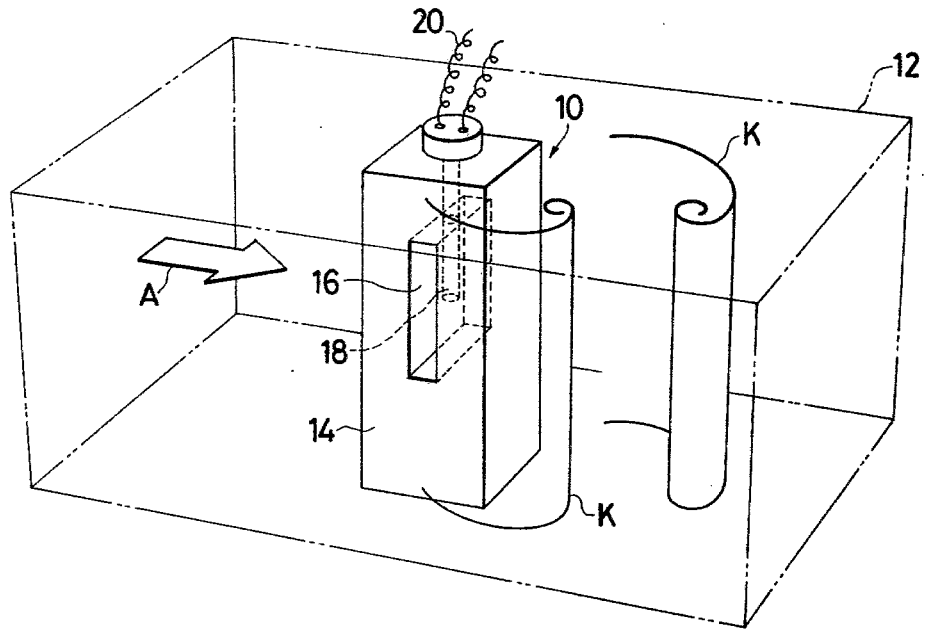
FIG. 1 is a perspective view of a conventionally used probe unit of a fluid flow rate measuring apparatus which puts the theory "Karman vortex street" into practical use.

Referring to FIG. 1, there is illustrated a conventional probe unit 10 supported in a conduit 12 in which a fluid, such as air, flows in the direction of arrow A. The probe unit 10 shown comprises a vortex generator 14 in the form of a rectangular prism body which has a slot 16 extending perpendicularly with respect to the flow direction "A" of the fluid in the conduit 12. As shown, the slot 16 is formed to have a uniformed rectangular cross section throughout the width thereof. Within the slot 16 is disposed a hot wire 18 such as, for example, a platinum wire or a tungsten wire which is connected to a control circuit (not shown) via lead wires 20.

In operation, the hot wire 18 is supplied with constant current to be heated. Under flowing of the fluid in the conduit 12, the heated wire 18 is cooled in proportion to the flow velocity of the fluid alternately flowing through the slot 16 caused by shedding of vortexes "K", which occurs periodically first from one side of the body 14 of the vortex generator and then from the other side. The cooling of the hot wire 18 will lower the electric resistance thereof, resulting in a drop of voltage applied thereto. The voltage variation of the hot wire 18 thus depends on the vortex shedding frequency which in turn depends on the relative velocity of the fluid flow. Thus, the fluid flow rate can be measured by only monitoring the voltage variation.

Figure 2:
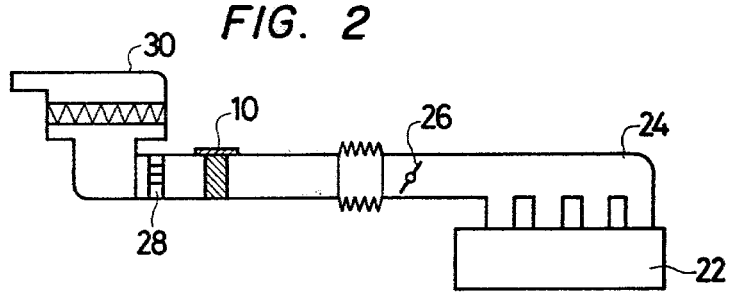
FIG. 2 is a schematic view of a reciprocating internal combustion engine with the probe unit of FIG. 1 disposed in the intake system of the engine.

In such conventional probe unit 10, however, insufficient measurement (described above) is sometimes encountered, especially when employed in a reciprocating internal combustion engine, in a manner as shown by FIG. 2, for automatically controlling the air-fuel ratio of charge fed into the engine. (In FIG. 2, the engine proper, intake manifold, throttle valve, air straightener and air cleaner are denoted by numerals 22, 24, 26, 28 and 30. In operation, information signals given by the probe unit 10 are applied to a control circuit (not shown) from which command signals are issued to operate fuel injectors (not shown) disposed in the intake manifold 24.) The insufficient measurement is caused by unavoidable generation of pulsation of the intake air during operation of the engine. The pulsation of the intake air causes a fluctuation of the intake air flow. The fluctuation in turn causes each vortex created by the vortex generator 14 to fail in having sufficient energy to create alternating air flow in the slot 16 by which flow the hot wire 18 is cooled, resulting in failure in accurately measuring the intake air flow rate.

DESCRIPTION OF THE PREFERRED EMBODIMENTS OF THE INVENTION

Therefore, an essential object of the present invention is to provide an improved probe unit which can measure the fluid flow rate with accuracy irrespective of occurrence of pulsation in the fluid flow.

Figure 3:
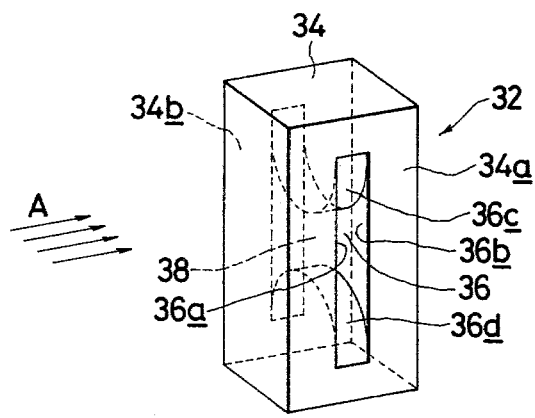
FIG. 3 is a perspective view of a probe unit of the present invention, with a sensing element being removed for clarification of the drawing.
Figure 4:
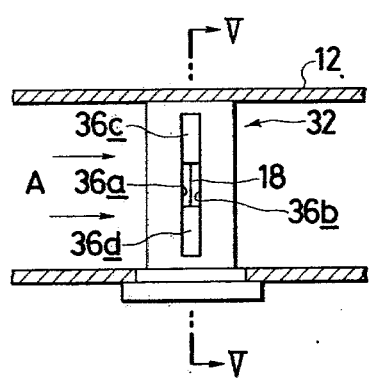
FIG. 4 is a side sectional view of the probe unit of FIG. 3, the probe unit being disposed in a fluid flow tube.
Figure 5:
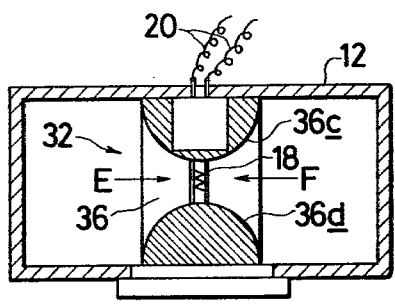
FIG. 5 is a sectional view taken along the line V—V of FIG. 4.

Referring to FIGS. 3 to 5, especially FIG. 3, there is shown a first embodiment of the probe unit of the invention, which is generally designated by numeral 32. The probe unit 32 is disposed in a conduit 12, such as the above-mentioned air intake system of the reciprocating internal combustion engine, in a manner to lie across the fluid stream substantially at right angles to the flow direction "A" of the fluid in the conduit 12.

As is best seen from FIG. 3, the probe unit 32 comprises a vortex generator 34 in the form of a rectangular prism having parallel side walls 34a and 34b. A slot 36 is formed in the vortex generator 34 to extend from one of the side walls to the other. The slot 36 is defined at its front and rear sections by parallel flat surfaces 36a and 36b and at its upper and lower sections by curved convex surfaces 36d and 36d, as shown, so that the sectional area of the slot 36 is gradually decreased with increase of distance from the entrance of the slot 36 to the middle of the same, thereby forming at the middle a restricted portion or throat 38. As is best seen from FIG. 5, the slot 36 is formed to be symmetric with respect to an imaginary plane which passes through the middle of the slot 36 substantially parallel to the flowing direction "A" of the fluid. Preferably, each of the curved upper and lower convex surfaces 36c and 36d is formed to include therein a hyperbola with a conic section thereof at the throat 38. It should be noted that the parallel flat surfaces 36a and 36b constituting the front and rear sections of the slot 36 are perpendicular with respect to the flow direction A of the fluid in the conduit 12, as is best shown in FIG. 4. As shown in FIG. 5, a sensing element 18, such as the above mentioned hot wire, is located in the throat 38 of the slot 36. The sensing element 18 is connected via lead wires 20 to a known control circuit (not shown). With this construction of the probe unit 32, it will be appreciated that the flow velocity of the fluid, which flow alternately in the slot 36 in response to shedding of the vortex "K" from the vortex generator 34, increases as the fluid in the slot 36 approaches the throat 38. The increase of fluid velocity improves not only the detecting ability but also the responsiveness of the probe unit as will be understood from the following established equations:

$$\text{Detecting Ability} = \alpha(Tw - Te)/2 \cdot \frac{1}{1 + \sqrt{Vo/V}} \quad (1)$$

$$(Vo = k/2\pi\rho Cpd)$$

$$\text{Time Constant} = \frac{\pi^2/4 \cdot d^4 Cw\rho w}{k(\pi d)^2(1/\pi + \sqrt{2\rho Cpd/\pi k \cdot V}) - KI^2 re\alpha} \quad (2)$$

wherein:
α: temperature coefficient of the hot wire;
Tw: temperature of the hot wire;
Te: temperature of the fluid to be measured;
Cp: specific heat of the fluid under constant pressure;
d: diameter of the hot wire;
Cw: specific heat of the hot wire;
ρw: density of the hot wire;
re: specific resistance of the hot wire;
I: intensity of current carried through the hot wire;
k: thermal conductivity of the fluid to be measured;
K: scale factor (from joul to call);
V: velocity of the fluid flowing through the slot 36;
ρ: density of the fluid.
(It should be noted that the decrease in Time Constant means the increase of the responsiveness.)

Figure 6A:
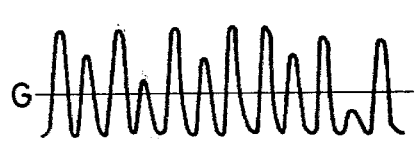
FIGS. 6a, 6b and 7a, 7b are waveform charts, depicting the performances of the conventional probe unit of FIG. 1 and the probe unit of FIG. 3 of the invention, respectively.
Figure 7A:
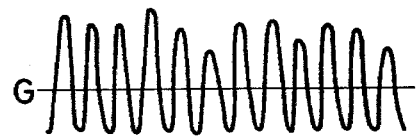
Figure 6B:
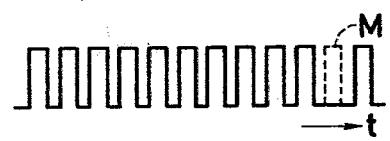
Figure 7B:

FIGS. 6 and 7 are charts respectively depicting the performances of the conventional probe unit 10 of FIG. 1 and the improved probe unit 32 of FIGS. 3 to 5 according to the invention, in which the signals designated by reference "a" are detector outputs directly given by the hot wire 18, while the signals designated by reference "b" are converted outputs which are provided from the detector outputs "a" with reference to the reference value G. From the charts shown by FIG. 6, it will be appreciated that in the conventional probe unit 10, a pulse which should be positioned at "M" of the converted outputs is mutilated. This is caused by lack of the stability of detector outputs. Thus, accurate measurement is not expected from such a conventional probe unit 10. While, in the probe unit 32 of the invention, such unwanted multilation of pulse does not occur due to the high stability of the detector outputs, so that highly accurate measurement is expected from such probe unit 32.

Figure 8:
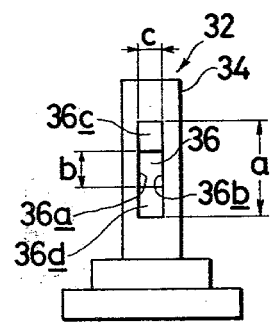
FIGS. 8 and 9 are side views of probe units of the invention, presented for explaining optimal configuration of slots formed in the vortex generators, the unit of FIG. 8 being one shown by FIG. 3, while the unit of FIG. 9 being a modification of the same.
Figure 9:
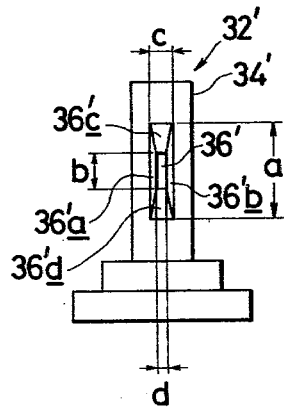

The next description is directed to optimal configuration of the slot formed in the vortex generator. For facilitation of the description, it will be made with reference to FIGS. 8 and 9 in which FIG. 8 shows the probe unit 32 as mentioned above, while FIG. 9 shows a modification of the unit 32. The slot 36' of the modified unit 32' is defined at its front and rear sections by curved convex surfaces 36'a and 36'b and at its upper and lower sections by curved convex surfaces 36'c and 36'd. In these drawings (FIGS. 8 and 9), references "a", "b" and "c" respectively represent the longitudinal length of the entrance of the slot 36 or 36', the distance between the curved upper and lower convex surfaces 36c and 36d or 36'c and 36'd at the throat and the width of the entrance of the slot 36 or 36', while, reference "d" in FIG. 9 represents the distance between the curved front and rear convex surfaces 36'a and 36'd at the throat of the slot 36'.

Experiment has revealed that in the case of the probe unit 32, a configuration satisfying the relation $0.1 < b/a < 0.6$ is effective for fluid flow rate measurement, while in case of the probe unit 32', a configuration satisfying the above-mentioned relation and the relation $0.05 < S_2/S_1 < 0.6$ is effective for such measurement, $S_1$ and $S_2$ respectively representing the sectional area of the entrance of the slot 36' and that of the throat of the same. Experiment has further revealed that in the case of the probe unit 32, a configuration satisfying both the relation $b/a = 0.23$ is optimal, while in case of the unit 32', a configuration satisfying both the relation $b/a = 0.23$ and the relation $S_2/S_1 = 0.1$ is optimal. Furthermore, it has been revealed that in the case of the probe unit 32 of FIG. 8, a configuration of the slot 36 satisfying the relation $b/c = 4$ to 20 is preferable.

FIGS. 10A to 10D are sectional views of vortex generators of the type which are found in the probe unit 32, showing that the curved upper and lower convex surfaces 36c and 36d of respective generators are different in shape by changing the radius of curvature "R" thereof. Effective width of each vortex generator is represented by reference "D". Thus, assuming that the effective width "D" is 20 mm and the distance "b" between the curved upper and lower convex surfaces of the slot 36 is 6 mm, the length "a" of the entrance of the slot 36 becomes 26 mm in the configuration of FIG. 10A wherein the radius of curvature "R" is 10 mm, 14 mm in FIG. 10B wherein "R" is 14.5 mm, 10 mm in FIG. 10C wherein "R" is 26 mm, and b mm in FIG. 10D wherein "R" is ∞. Experiment has revealed that, in such type slot, a configuration of it satisfying the relation 0.5≦R/D≦1.5 is effective for the fluid flow rate measurement, and the configuration of FIG. 10A satisfying the relation R/D=0.5 is optimal.

FIGS. 11A to 11D are waveform charts of detector outputs respectively depicting the performances of the above-mentioned four vortex generators of FIGS. 10A to 10D each using a plutinum wire (diameter: 5 μm) as a hot wire. These outputs were obtained under a condition wherein each probe unit is immersed in an air stream having an average flow rate of 30 m/sec. In view of a fact that the detecting ability and the responsiveness of the probe unit are improved as the amplitude of the detector output waveforms becomes large with less amplitude fluctuation, it will be appreciated that the probe unit comprising the generator of FIG. 10A is best in measuring the air flow rate.

Figure 12:
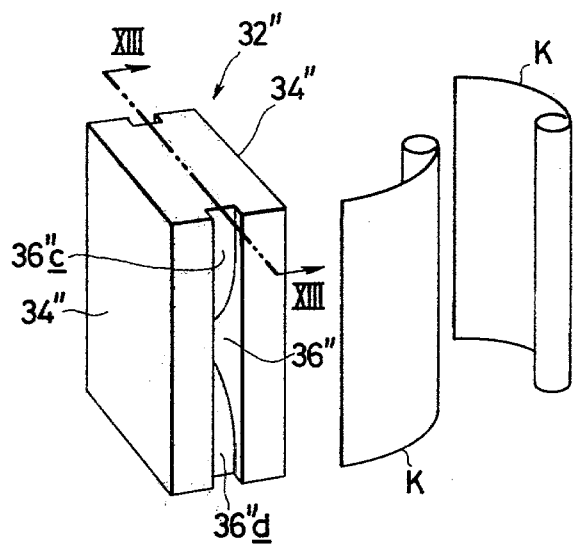
FIG. 12 is a perspective view of another modification of the probe unit of FIG. 3, showing also vortexes created by the probe unit.
Figure 13:
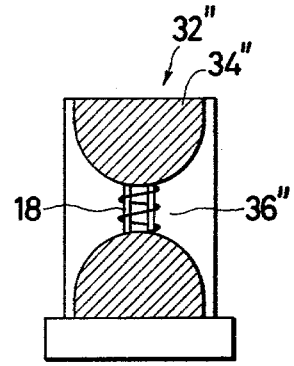
FIG. 13 is a sectional view taken along the line XIII—XIII of FIG. 12.

Referring to FIGS. 12 and 13, there is shown another modification of the probe unit 32 of the invention. The modified probe unit 32″ herein-disclosed is generally the same as that of FIG. 10A except for a slight difference appearing at the entrances of the slot 36″. As is shown in these drawings (FIGS. 12 and 13), the side ends of each convex surface 36″c or 36″d are located in grooves (no numerals) extending vertically throughout the longitudinal length of the vortex generator 34″. In the case of the probe unit of FIG. 10A, however, such ends of the convex surface 36c or 36d terminate at upper and lower edges of the side walls 34a and 34b of the vortex generator 34.

Figure 14:
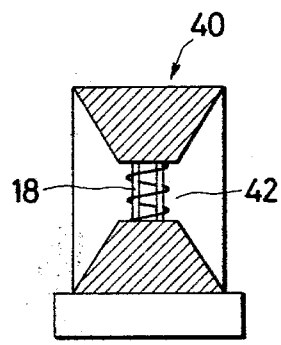
FIGS. 14 and 15 are sectional views of probe units, showing other embodiments of the invention.
Figure 15:
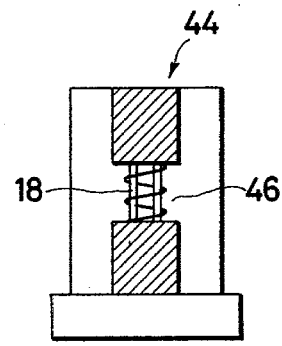

Referring to FIGS. 14 and 15, there are respectively illustrated other embodiments which employ flat surfaces, for defining the upper and lower sections of the slot in the vortex generator, as a substitute for the beforementioned curved convex surfaces such as 36c and 36d. The slot 42 of the probe unit 40 of FIG. 14 is defined at its upper and lower sections by inclined flat surfaces and horizontal surfaces, while the slot 46 of the probe unit 44 of FIG. 15 is defined at its upper and lower sections by vertical surfaces and horizontal surfaces. Further, the entrances of the slot 42 or 46 extend vertically throughout the longitudinal length of the corresponding vortex generator. Experiment has revealed that any type of slot is available for improving the fluid flow rate detecting ability of the probe unit so long as a restricted section or throat is provided in the middle of the slot and the entrances of the slot extend vertically throughout the longitudinal length of the corresponding vortex generator.

In the probe units of the type having relatively large entrances of the slot, such as those of FIGS. 10A, 12(13), 14 and 15, the shedding of the Karman vortexes from the vortex generator is optimally made because at the entrances of the slot, the velocity of the alternating air flow in the slot becomes considerably low thereby failing to disturb such shedding. Thus, more accurate air flow rate measurement is achieved in such probe units.

What is claimed is:

1. A probe unit of a fluid flow rate measuring apparatus which measures a flow rate of a fluid, comprising a vortex generating body arranged to lie across the fluid stream substantially at right angles to the flow direction of said fluid, said body including a slot which extends therethrough substantially perpendicular with respect to the flow direction of the fluid, and transducer means responsive to variations in hydrodynamic conditions within said slot for converting hydrodynamic variations into variations of an electrical parameter of said transducer means wherein said slot is bounded at its upper and lower opposed sections by convexly curved surfaces so that the sectional area of said slot is gradually decreased with increase of distance from each of the entrances of said slot to the middle of the same, thereby leaving at the middle section of the slot a throat portion.

2. A probe unit is claimed in claim 1, wherein said slot is defined at its front and rear sections, with respect to the direction of fluid flow, by parallel flat surfaces.

3. A probe unit as claimed in claim 1, wherein said slot is defined at its front and rear sections, with respect to the direction of fluid flow, by curved convex surfaces.

4. A probe unit as claimed in claim 1, wherein the entrances of said slot extend throughout the longitudinal length of said body.

5. A probe unit as claimed in claim 4, wherein the side ends of each of said convexly curved surfaces are located in grooves which extend throughout the longitudinal length of said body.

6. A probe unit as claimed in claim 1, wherein said slot is formed to satisfy the relation $0.1 < b/a < 0.6$, wherein said "a" represents the longitudinal length of each of the entrances of said slot, while said "b" represents the distance between the convexly curved upper and lower surfaces at said throat portion.

7. A probe unit as claimed in claim 1, wherein said slot is formed to satisfy the relation $0.5 \leq R/D \leq 1.5$, wherein said "D" represents the effective width of said body, while said "R" represents the radius of curvature of each of said convexly curved surfaces.

8. A probe unit as claimed in claim 1, wherein said slot is formed to be symmetric with respect to an imaginary plane passing through the middle of the slot substantially parallel to the flow direction of the fluid.

9. A probe unit as claimed in claim 1, wherein each of said convexly curved upper and lower surfaces of the slot is formed to include therein a hyperbola with a conic section thereof at the throat portion.

* * * * *